United States Patent [19]     [11] 3,976,721
Satake et al.     [45] Aug. 24, 1976

[54] METHOD OF PRODUCING POLYSTYRENE COMPOSITION

[75] Inventors: Kunio Satake, Yokohama; Tsuyoshi Yamada, Yokosuka; Kuniaki Sakamoto, Yokohama; Kiyoshi Hayakawa, Yokohama; Isaburo Fukawa, Yokohama, all of Japan

[73] Assignee: Asahi Kasei Kogyo Kabushiki Kaisha, Osaka, Japan

[22] Filed: June 3, 1975

[21] Appl. No.: 583,265

[30] Foreign Application Priority Data
June 12, 1974    Japan .............................. 49-66057

[52] U.S. Cl. .............................. 260/880 R; 526/340
[51] Int. Cl.$^2$ ......................................... C08L 9/06
[58] Field of Search ...................... 260/83.7, 880 R; 526/340

[56] References Cited
UNITED STATES PATENTS

| | | | |
|---|---|---|---|
| 3,094,512 | 6/1963 | Short | 260/83.7 |
| 3,278,642 | 10/1966 | Lee | 260/880 R |
| 3,309,422 | 3/1967 | Doak | 260/880 R |
| 3,402,159 | 9/1968 | Hsieh | 260/83.7 |
| 3,428,712 | 2/1969 | Carrock | 260/880 R |
| 3,475,514 | 10/1969 | Nemphos | 260/880 R |
| 3,660,534 | 5/1972 | Carrock | 260/880 R |
| 3,674,760 | 7/1972 | Halasa | 260/83.7 |
| 3,726,844 | 4/1973 | Halasa | 260/83.7 |
| 3,759,919 | 9/1973 | Dillenschneider | 260/83.7 |

*Primary Examiner*—Paul R. Michl
*Attorney, Agent, or Firm*—Armstrong, Nikaido & Wegner

[57] ABSTRACT

A novel high-impact polystyrene composition superior to conventional high-impact polystyrene composition, in low temperature high-impact properties, tensile strength, processability, toughness, stiffness, etc. can be obtained by a radical polymerization of a mixture of (1) 2–20% by weight of a random copolymer having a composition of continuously and gradually reduced styrene content along the polymer chain of the copolymer which is obtained by the solution polymerization of butadiene and styrene in the presence of a lithium base catalyst and (2) 80–98% by weight of styrene, carried out in bulk polymerization manner or in a manner in which bulk and suspension polymerizations are used in series.

14 Claims, 1 Drawing Figure

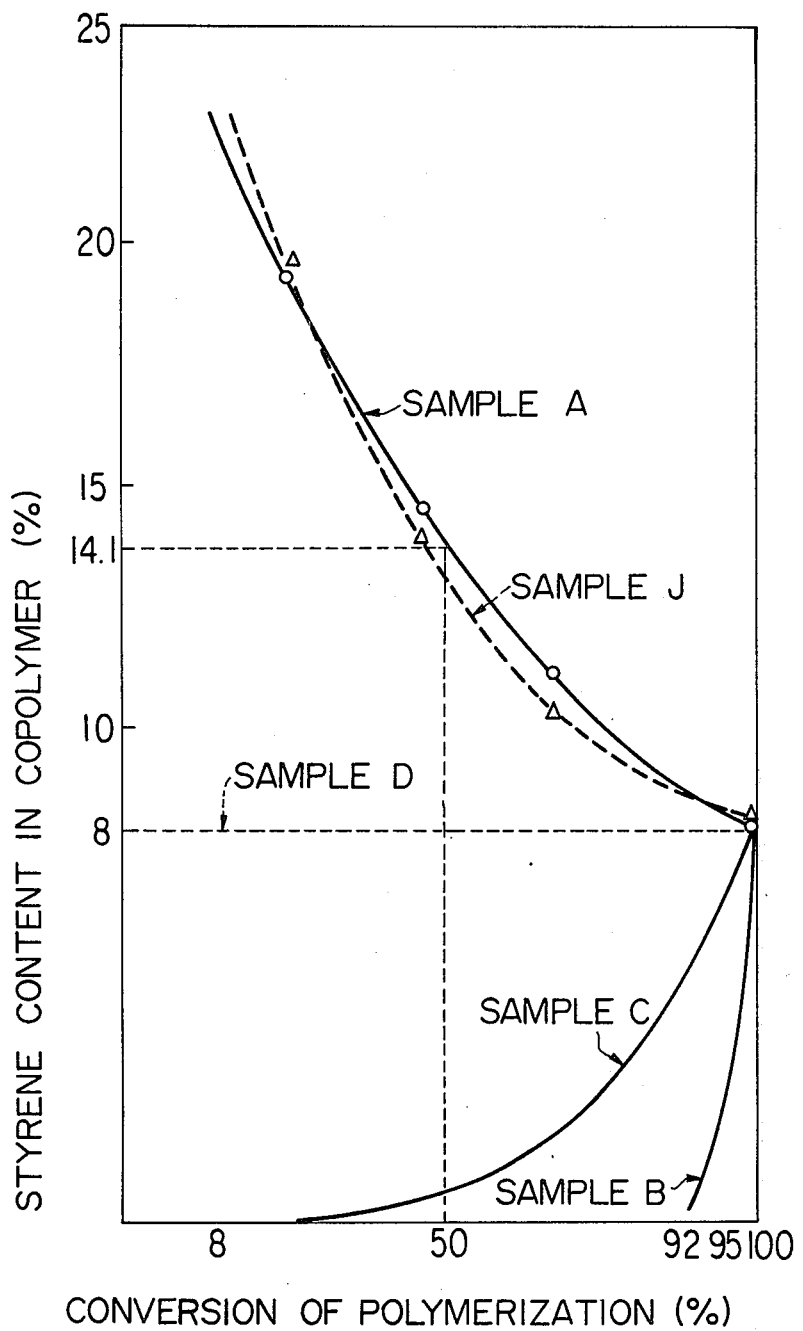

METHOD OF PRODUCING POLYSTYRENE COMPOSITION

DESCRIPTION OF THE INVENTION

This invention relates to a method for producing a useful high-impact polystyrene composition superior in high-impact properties and appearance.

In order to improve brittleness of styrene polymers, high-impact polystyrenes have heretofore been produced according to a process in which a styrene solution of unvulcanized rubber is polymerized or another process in which styrene polymer is mechanically mixed with unvulcanized rubber. Among them, high-impact polystyrenes obtained according to bulk (or mass) or bulk-suspension polymerization of a styrene solution of unvulcanized rubber are particularly superior in high-impact properties. In such cases, as unvulcanized rubber to be used as a toughening agent in a polystyrene composition, there can be mentioned an emulsion-polymerization rubber (or emulsion polymer rubber), a solution-polymerization rubber (solution polymer rubber) which is obtained by using a lithium base catalyst in polymerization, etc. The solution-polymerization rubber has a characteristic feature in the point that color tone of the resultant polystyrene composition is notably improved compared with the emulsion-polymerization rubber and resistance to impact is superior at low temperatures.

Particularly, the polystyrene composition in which a so-called low-cis solution-polymerization-polybutadiene such as those obtained by the polymerization carried out by using a lithium base catalyst to provide products having a cis-1,4 linkage of 25–45%, a 1,2-vinyl linkage of 20% or less, and a trans-1,4 linkage of the balance % is used as a toughening agent, is particularly superior in high-impact properties at low temperatures.

However, there are some drawbacks to be encountered in the production of high-impact polystyrene composition carried out by using a solution-polymerization polybutadiene as a toughening agent. Namely, on account of the restriction requirement from the molecular weight of solution-polymerization-polybutadiene used for imparting toughness to the composition, a kind of rubber must be used which shows a high solution viscosity when dissolved in styrene, but this is disadvantageous for stirring and transporting at the time of commercial production. Further, an excessive cross-linking reaction occurs already at the stage of continuous phase of styrene solution of rubber during the polymerization time of styrene. A gel-form material is liable to be formed on the wall of reaction vessel, heat-transmission pipe, stirrer or the like for the case ascribable to solution-polymerization polybutadiene, and such a material gets mixed in polystyrene to form visible gel (fish eye). Thus, there occur undesirable properties, particularly a problem of reduction in commercial value of product in case a product is extruded into a thin sheet form material.

Further, high-impact polystyrene compositions produced by using a solution-polymerization-polybutadiene as a toughening agent, have the following drawbacks in the physical properties. Namely, due to the large difference between refractive indexes of rubber and polystyrene, products become whiter and more difficult to be colored with coloring materials, and form a too noticeable weld-line, compared with SBR. Particularly in case of sheet formed shaped articles, it is to be noted that their rigidity and stiffness are inferior to those in case of SBR.

Thus, attempts have been made to produce balanced high-impact polystyrene compositions having overcome the above-mentioned various drawbacks brought about when solution-polymerization-polybutadiene is used as a toughening agent.

For example, in Japanese Pat. No. 15017/1971, there is disclosed that a high-impact polystyrene composition obtained by using as a toughening agent, a solution-polymerization-SBR of a random copolymer type consisting of styrene and 1,3-butadiene and having a styrene content of 15–30% by weight and a micro structure of butadiene, consisting of a cis-1,4 linkage of 25–45%, a 1,2-vinyl linkage of 5–25% and a trans 1,4 linkage of the balance %, has a higher tensile strength, a better processability than the compositions obtained by using a solution-polymerization-polybutadiene, and is suitable particularly to deep forming products.

Further, in Japanese Patent Publication No. 1374/1972, there is disclosed that among random copolymers of 1,3-butadiene and styrene having a styrene content of 15–30% by weight, those copolymers having a Mooney viscosity of 60–150 and a relaxation time (orientation time) of 7 to 200 seconds as measured with a Mooney viscosimeter, when they are used as a toughening agent, provide a high-impact polystyrene composition capable of producing shaped articles superior in gloss and appearance and higher in the strength of weld-line of injection-molded products, compared with compositions obtained by using a solution-polymerization-polybutadiene, and also superior in processability.

Recently, however, various kinds of shaped articles made of high-impact polystyrene composition have been used frequently at extremely low temperatures lower than −40°C in the application fields to refrigerated cakes or food stuffs.

However, it is substantially impossible for the polystyrene compositions prepared by using a solution-polymerization type SBR which are disclosed in the above-mentioned patent literatures, to retain high-impact properties at such low temperatures. Thus, it is the state of art that, for high-impact polystyrene compositions which are to be used at such low temperatures, even a solution-polymerization SBR cannot be practically used as a toughening agent, regardless to say an emulsion-polymerization-SBR.

As the result of extensive studies carried out by us for the object in improving the above-mentioned low temperature high-impact properties without impairing the advantage of the high-impact polystyrene composition in which a solution-polymerization-SBR is used, it has been discovered that a following high-impact polystyrene composition satisfies the above-mentioned object and completed the present invention. Said high impact polystyrene composition is prepared by a radical polymerization of a mixture consisting of 1. 2–20% by weight of a solution-polymerization SBR of a random copolymer type obtained by a solution-polymerization of butadiene and styrene in the presence of a lithium-based catalyst, and having a styrene content continuously and gradually reduced along the polymer chain (wherein the styrene content in said random copolymer is in the range of 3–10% by weight; the butadiene content therein is in the range of 90–97% by weight; among the modes of linkage in butadiene portion, 1,2-vinyl linkage is 20% or less; the block styrene content is 20% or less by weight of the total styrene content; and when the polymer chain (A-B) is divided into two equal molecular weight portions A and B, portion A has a styrene content of 1.5–2 times the average styrene content in the total copolymer and portion B has a styrene content of ½ or less of the average styrene content in the total copolymer), and 2. 80–98% by weight of styrene, said polymerization being carried out in a bulk polymerization manner or in a manner of bulk and suspension polymerization in series in this order.

The toughening agent used in the composition of the present invention will be referred to hereinafter as "solution-polymerization-SBR of gradually-reduced-random-copolymer type". Said terms "gradually-reduced" can be also referred to as "tapered".

The high-impact polystyrene composition of the present invention 1. is superior in high-impact properties at low temperatures lower than −40°C and almost equal in other physical properties, as compared with a solution-polymerization-SBR of random-copolymer-type, and 2. has better tensile strength and stiffness, i.e. so-called nerve, and on the other hand, its high-impact properties are almost equal at room temperature and lower temperatures, as compared with composition wherein solution-polymerization-polybutadiene is used. Further the solution-polymerization-SBR of gradually-reduced-random-copolymer type of the present invention provides size of dispersed rubber particle imparting a superior toughness even when the viscosity at the time of dissolution is styrene is low, and also the formation of visible gel during the time of styrene polymerization is small, as compared with solution-polymerization-polybutadiene.

It is preferable that the styrene content in the solution-polymerization-SBR of gradually-reduced-random-copolymer type (consisting of butadiene and styrene) is in the range of 3–10% by weight. If the styrene content is less than 3% by weight, the extent of increase in stiffness i.e. so-called nerve, of the composition is slight compared with solution-polymerization-polybutadiene, the viscosity of styrene solution is higher and visible gel is liable to form. If the styrene content is greater than 10% by weight, the low temperature characteristic properties of the composition are reduced and the toughening effect is inferior.

It is preferable that as for the micro structure of butadiene in the solution-polymerization-SBR of gradually-reduced-random-copolymer type of the present invention, 1,2-vinyl linkage is 20% or less. If 1,2-vinyl linkage is greater than 20%, the reduction in low temperature characteristic properties of the resultant high-impact polystyrene is notable.

The most characteristic feature of the solution-polymerization-SBR of gradually-reduced-random-copolymer type of the present invention lies in the point that the proportion of styrene portion in polymer is continuously reduced and that of butadiene portion is continuously increased along the copolymer chain.

Namely, as described above, in said copolymer, the proportion of styrene decreases continuously and its ratio of decrease is characterized in that when said polymer chain (A-B) is divided into two equal molecular weight portions A and B, the portion A has a styrene content which is 1.5–2 times the average styrene content in the total copolymer and the remaining portion B has a styrene content which is ½ or less of the average styrene content in the total copolymer.

Said copolymer is referred to herein as a solution-polymerization-SBR of gradually-reduced-random type, and it can be said that this is a new copolymer synthesized with a novel concept which has never been known.

Polystyrene composition obtained by using as a toughening agent, a solution-polymerization-SBR of common, uniform random copolymer type, and having a different distribution of styrene composition in the copolymer, from that of the solution-polymerization-SBR of gradually-reduced-random-copolymer type, is much inferior in low temperature high-impact properties, to the polystyrene composition of the present invention.

On the other hand, when a solution-polymerization-SBR having a deviation of styrene component in the copolymer, greater than that of the solution-polymerization-SBR of gradually-reduced-random-copolymer type used as a toughening agent in the present invention, is used as a toughening agent, polystyrene composition having balanced physical properties as in the case of the present invention cannot be obtained at all. As one example of the above-mentioned solution-polymerization-SBR having a large deviation of styrene composition, there are known a solution-polymerization-SBR of block copolymer type and that of gradually-reduced-copolymer type, but these are so-called block polymer in which more than half of the styrene in the copolymer is block-styrene and which is easily distinguishable from the solution-polymerization-SBR of gradually-reduced-random-copolymer type which hardly contains block-styrene.

Polystyrene composition obtained by using as a toughening agent, a so-called solution-polymerization-SBR of block-copolymer type having a greater deviation of styrene composition than that of the solution-polymerization-SBR of gradually-reduced-random-copolymer type of the present invention is superior in appearance such as gloss, lustre, etc. as compared with usual polystyrene compositions, but its high-impact property itself is not always greater than those of the products obtained by using a conventional toughening agent, particularly such as solution-polymerization-polybutadiene, solution-polymerization-random-SBR or the like. This is ascribable to the fact that the compatibility of the solution-polymerization-SBR of block copolymer type with polystyrene is good and size of rubber particle dispersed in toughened polystyrene is liable to become fine.

The proportion of the block-styrene in the solution-polymerization-SBR of gradually-reduced-random-copolymer type used as a toughening agent in the present invention is preferably 20% by weight or less, and more preferably 10% by weight or less. Accordingly, in case of solution-polymerization-SBR having a styrene content of 10% by weight, it is desirable that the proportion of block-styrene is 2% by weight or less, preferably 1% by weight or less. In case of solution-polymerization-SBR having a styrene content of 3% by weight, it is desirable that the proportion of block-styrene is 0.6% by weight or less, preferably 0.3% by weight or less.

In case of the proportion of block-styrene of more than 20% by weight in the styrene in the solution-polymerization-SBR of gradually-reduced-random-copolymer type used as a toughening agent, the size of rubber particles dispersed in toughened polystyrene is liable to become finer and is not preferable for toughening agent.

It is preferable that the content of the toughening agent in the composition of the present invention is in the range of 2 to 20% by weight of the total amount of the composition. The content less than 2% by weight does not provide substantial increase of high-impact properties of the composition, and the content greater than 20% by weight exceedingly reduces the tensile strength, hardness and processability of the composition.

With regard to the practical production method of the high-impact polymer composition of the present invention, bulk polymerization manner, or manner of bulk and suspension polymerizations in series can be used advantageously in commercial operation.

In general, in case of bulk polymerization, a solution-polymerization-SBR of gradually-reduced-random-copolymer type is dissolved in styrene and in case of no catalyst, heat polymerization is carried out usually at 95°C to 200°C and in case of catalytic polymerization or irradiation-induced polymerization, polymerization is carried out generally at lower temperatures, usually at 20°–150°C, while continuing the polymerization operation until polymerization of styrene is substantially completed. In such bulk polymerization, a known internal lubricant, e.g. liquid paraffin is added in an amount of 1–5 parts by weight to 100 parts by weight of polymer composition. After completion of polymerization, if a small amount of unreacted styrene, usually 1–3% by weight, is included, it is preferable to eliminate such styrene by a known method, e.g. elimination under vacuum or by using an extruder equipped with venting means for volatile matter. Stirring is carried out if necessary during bulk polymerization, but it is preferable to stop or weaken the stirring after styrene polymerization rate is advanced to 30% or more. Too excessive stirring often reduces the strength of composition. If necessary, polymerization is carried out in the presence of a small amount of a diluent such as toluene, ethylbenzene or the like, and after completion of polymerization these diluents can be removed by heating together with unreacted styrene.

Further a manner of bulk and suspension polymerizations in series is also useful in the production of a high-impact polymer composition. In this process, the former half of the reaction is carried out in bulk polymerization manner and the latter half of the reaction is carried out in suspension state. Namely a styrene solution of a solution-polymerization-SBR of gradually-reduced-random-copolymer type of the present invention is subjected, as in case of the above-mentioned bulk polymerization, to heat-polymerization without catalyst, polymerization with addition of catalyst, heat polymerization with addition of catalyst or irradiation-induced polymerization to polymerize styrene partially to an extent of usually 50% or less, particularly 10 to 40%. This is the former half of bulk polymerization. Resulting partially polymerized mixture is dispersed with stirring in an aqueous medium in the presence of a suspension stabilizer or a suspension stabilizer and a surfactant, and then the latter half of the reaction is completed in suspension polymerization manner as in case of the above-mentioned suspension polymerization. Thereafter, washing, drying and if necessary, pelletizing or grinding are carried out to obtain practically useful products.

In addition to the above-mentioned processes, useful high-impact polymer composition can be obtained by the modification and the improvement of these processes.

One part of the styrene in the styrene polymer which forms a high-impact polymer composition together with a solution-polymerization-SBR of gradually-reduced-random-copolymer type in the present invention can be replaced by a monomer other than styrene which is copolymerizable with styrene. Such a copolymerizable monomer other than styrene can be used in the range of 50% by weight or less of the total monomer including styrene.

As such copolymerizable monomers other than styrene, one or more kinds of members selected from monovinyl aromatic hydrocarbon such as α-methylstyrene, vinyltoluene, vinylethylbenzene, vinylxylene, vinylnaphthalene, acrylonitrile, methyl methacrylate, etc.

One part of the styrene which forms the solution-polymerization-SBR of gradually-reduced-random-copolymer in the method of the present invention can be replaced by a monovinyl aromatic hydrocarbon other than styrene. Such a monovinyl aromatic hydrocarbon other than styrene, which is copolymerizable with styrene, can be used usually in the range of 50% by weight or less of the total monovinyl aromatic hydrocarbon of the above-mentioned SBR. As such monovinyl aromatic hydrocarbons there can be mentioned vinyltoluene, vinylethylbenzene, vinylxylene, vinylnaphthalene or the like. One or more kinds of these compounds can be used.

One part of 1,3-butadiene which forms the above-mentioned solution-polymerization-SBR can be replaced by a conjugated diolefin other than 1,3-butadiene, for example, isoprene, 1,3-pentadiene, 2,3-dimethyl-1,3-butadiene, 2-ethyl-1,3-butadiene, 2,3-diethyl-1,3-butadiene, 2-phenyl-1,3-butadiene, 2,3-diphenyl-1,3-butadiene or the like. Such a conjugated diolefin other than 1,3-butadiene can be used usually in the range 50% by weight or less of the total weight of the conjugated diolefin of the above-mentioned SBR. One or more kinds of such conjugated diolefin can be used.

Illustrative lithium base catalysts used as a polymerization catalyst for the solution-polymerization-SBR of gradually-reduced-random-copolymer type in the present invention are propyllithium, n-butyllithium, sec-butyllithium, amyllithium, dilithiobutane, naphthyllithium, 1,4-dilithiobenzene or the like.

The solution-polymerization-SBR of gradually-reduced-random-copolymer type to be used as a toughening agent in the present invention can be usually obtained according to the following method, but the production method is not limited to such a method alone.

When copolymerization is carried out in the coexistence of 1,3-butadiene and styrene generally in a hydrocarbon medium and by the use of a lithium base catalyst but without adding a special additive or polymerization catalyst, since the polymerization reaction rate of 1,3-butadiene is much greater than that of styrene, 1,3-butadiene polymerizes at first, then styrene combines to the terminals of active butadiene polymer already formed in block form to produce a block copolymer consisting substantially of 1,3-butadiene polymer and styrene polymer. On this account, as one process for producing a solution-polymerization polymer of gradually-reduced-random-copolymer type of the present invention, the styrene content in the mixed solution of 1,3-butadiene and styrene prepared at first is made greater than that in the copolymer ultimately formed, and after starting of polymerization, copolymerization is carried out by continuously adding a fixed amount of 1,3-butadiene to increase gradually the proportion of 1,3-butadiene in the unreacted monomer mixture, and the production can be carried out by running a series of experiments in advance in order to set a suitable polymerization temperature and feeding speed of 1,3-butadiene.

In another method, a mixed solution of 1,3-butadiene and styrene is fed to a hydrocarbon solvent containing a lithium base catalyst at a speed slower than the polymerization rate of said monomer, and the proportion of styrene in said mixed solution of monomers is reduced with the increase of feeding time, whereby a solution-polymerization-SBR of gradually-reduced-random-copolymer type of the present invention to be used as a toughening agent can be prepared.

In a still other method, a mixed solution of 1,3-butadiene and styrene and a lithium base catalyst are continuously fed to a polymerization vessel having a temperature so established that the polymerization of the monomers may be substantially completed in the polymerization vessel, and the resulting polymer after substantial completion of polymerization is continuously withdrawn from the polymerization vessel, to give a solution-polymerization-polymer of gradually-reduced-random-copolymer type of the present invention.

Further, by adding as a randomization agent, a polar substance such as tetrahydrofuran, diethylether, triethylamine, tri-n-butylamine, hexamethylphosphoroamide to a hydrocarbon solvent containing a lithium base catalyst, then continuously feeding a mixed solution of 1,3-butadiene and styrene while decreasing the proportion of styrene in the mixed solution with the progress of feeding time, said copolymer aimed can be also obtained. In the copolymerization carried out in the presence of such a polar substance, there is a tendency that the content of 1,2-vinyl linkage in the butadiene portion of the resulting copolymer is increased, but, in order to maintain the excellent feature of the high-impact polymer composition of the present invention in the point of characteristic physical properties, particularly low temperature characteristic properties, it is preferable that the content of 1,2-vinyl linkage in the butadiene portion is in the range of 20% or less.

The above-mentioned are illustrative methods for producing solution-polymerization-SBR by way of random copolymerization of 1,3-butadiene and styrene, but in any of these methods, the resultant solution-polymerization-SBR of gradually-reduced-random-copolymer type is useful as a toughening agent of the present invention. As for Mooney viscosity of said SBR, those in the range of 20 to 100, preferably in the range of 30 to 80 are selected.

The high-impact polystyrene composition thus obtained is extremely balanced composition in which the drawbacks of conventional high-impact polystyrene compositions composed of styrene or composed mainly of styrene have been eliminated in all respects of low temperature high-impact properties, tensile strength, processability, toughness, stiffness and the like, as compared with the above-mentioned conventional compositions.

By using the high-impact polystyrene composition of the present invention, it has now become possible to produce various useful products such as injection-molded products, extrusion-molded products, etc. Thus the industrial meaning of the present invention is great.

Further, the high-impact polystyrene composition of the present invention can be used in admixture with antioxydant, ultraviolet absorber, lubricant, releasing agent, filler, various thermoplastic resins, etc., if necessary.

The present invention is further illustrated by the following non-limitative examples.

EXAMPLE 1

A solution-polymerization-SBR of gradually-reduced-random-copolymer type to be used in the composition of the present invention, having a styrene content of 8% (sample A) was obtained according to the following method:

To 1,000 parts by weight of a cyclohexane solution containing 11 parts by weight of a mixture of 1,3-butadiene with styrene in a ratio by weight of the former to the latter, of 1:10, was added 0.075 part by weight of n-butyllithium in the form of 15% by weight cyclohexane solution, and the resulting mixture was copolymerized at 80°C. When the copolymerization was initiated, 114 parts by weight of 1,3-butadiene in the form of 10% by weight cyclohexane solution were continuously fed to the mixture at a constant rate over 4.5 hours and polymerized to give an aimed solution-polymerization-SBR of gradually-reduced-random-copolymer type.

With the progress of polymerization, a part of polymer solution was sampled to determine the conversion of polymerization and the styrene content.

The results are shown in Table 1 and as curve A in the accompanying drawing. As seen in these results, the styrene content decreased together with the conversion of polymerization, and the styrene content in the polymer at the time of a conversion of polymerization of 50% was 14.1% by weight, while that at the time of completion of polymerization was 8.0% by weight. Thus, the styrene content in the polymer part formed by the polymerization during the conversions of polymerization of from 50% up to 100%, is calculated as 1.9% by weight.

After completion of the polymerization reaction, to the resulting copolymer solution was added one part by weight of di-tert-butyl-p-cresol per 100 parts by weight of the copolymer, as a stabilizer, followed by removal of solvent by stripping with heating to isolate the copolymer. Sample A thus obtained had a styrene content of 8.0% by weight; a block-styrene content of 0.8% by weight; a 1,2-vinyl linkage in the butadiene portion of 13.0%; and a Mooney viscosity ($ML_{1+4}$) of 45. The styrene content was measured by the use of spectrophotometer and calculated from the absorption of styrene at 270 m$\mu$.

Further the block-styrene content was determined as follows:

Two parts by weight of the copolymer were dissolved in 100 parts by weight of carbon tetrachloride, followed by adding 5 parts by weight of di-tert-butylhydroperoxide, further adding 0.01 part by weight of asmium tetraoxide, and heating at 100°C for 30 minutes, whereby the double bond in the copolymer was completely decomposed by oxidation. A large amount of methanol was added to the resulting solution to form precipitate. This is a block-styrene. The precipitate was filtered, vacuum-dried and weighed, and the block-styrene content was calculated as % by weight in the copolymer. Mooney viscosity ($ML_{1+4}$) was measured using a large type rotor. Namely, after preheating at 100°C for one minute, the rotor was revolved for 4 minutes to give a reading of the Mooney viscosimeter. The Mooney viscosity was expressed by this reading.

Next, for comparison, to 10% by weight cyclohexane solution containing 115 parts by weight of 1,3-butadiene was added 0.080 part by weight of n-butyllithium in the form of 15% by weight cyclohexane solution, followed by polymerization at 80°C for 3 hours to polymerize the whole amount of 1,3-butadiene. Thereafter, to the resulting active polybutadiene were added 10 parts by weight of styrene, followed by further polymerization for 3 hours, to give a solution of a block copolymer consisting of 1,3-butadiene polymer block and styrene polymer block. To the block copolymer solution was added one part by weight of di-tert-butyl-p-cresol per 100 parts by weight of the copolymer as a stabilizer, followed by dissolving, stripping of solvent with heating, thereby to isolate the copolymer. The resulting copolymer had a styrene content of 8.2% by weight; a 1,2-vinyl linkage of 12.5%; a block-styrene content of 8.1% by weight; and a Mooney viscosity of 46. The copolymer is referred to as a solution-polymerization-SBR of complete-block-copolymer type (sample B). Its conversion of polymerization and styrene content in polymer are shown in the accompanying drawing.

For further comparison, to 1,000 parts by weight of a cyclohexane solution containing 125 parts by weight of a monomer mixture of 1,3-butadiene and styrene in a ratio by weight of the former to the latter, of 92:8, was added 0.075 part by weight of n-butyllithium in the form of 15% by weight cyclohexane solution, followed by polymerization at 80°C for 4 hours to give a solution of a block copolymer consisting substantially of 1,3-butadiene polymer block and styrene polymer block. To the block copolymer solution was added one part by weight of di-tert-butyl-p-cresol per 100 parts by weight of the copolymer, as a stabilizer, followed by stripping of solvent with heating to isolate the copolymer. The resulting copolymer had a styrene content of 8.1% by weight; a 1,2-vinyl linkage (as a mode of butadiene linkage) of 12.5%; a block-styrene content of 5.5% by weight; and a Mooney viscosity of 45. This copolymer is referred to as a solution-polymerization-SBR of gradually-reduced-block-copolymer type (sample C).

The relationship between the conversion of polymerization and the styrene content in polymer is shown in the accompanying drawing.

For still further comparison, 0.075 part by weight of n-butyllithium was dissolved in 1,000 parts by weight of cyclohexane. Polymerization was carried out at 80°C, while feeding to the resulting solution, a solution of a monomer mixture of 115 parts by weight of 1,3-butadiene and 10 parts by weight of styrene, continuously at a constant rate over 10 hours, to give a solution of a complete random copolymer of 1,3-butadiene and styrene. To this copolymer solution was added one part by weight of di-tert-butyl-p-cresol per 100 parts by weight of the copolymer, as a stabilizer, followed by stripping solvent with heating to isolate the copolymer. The resulting copolymer had a styrene content of 80% by weight; a 1,2-vinyl linkage (as a mode of butadiene linkage) of 12.3%; a block-styrene content of 0% by weight; and a Mooney viscosity of 47. Further, during the polymerization, a part of the polymer solution was sampled to determine the conversion of polymerization of the monomer mixture and the styrene content in the resulting polymer. As a result, as shown in the accompanying drawing, the styrene content in the resulting polymer was almost constant irrespective of the conversion of polymerization. The copolymer is referred to as a solution-polymerization-SBR of random-copolymer type (sample D).

Still further, Nipol 1006 (trademark of product made by Japanese Zeon Company, Ltd.) which is an emulsion-polymerized SBR (sample E), and a solution-polymerization polybutadiene (a polybutadiene of a Mooney viscosity of 45 which is a blend of Diene-35A and Diene-55A [both, trademarks of products made by Asahi Kasei Kogyo Kabushiki Kaisha] in a ratio by weight of 1:1) (sample F) (the above-mentioned emulsion-polymerization-SBR and solution-polymerization-polybutadiene having heretofore been often used as a toughening agent), were employed as comparison samples.

The physical properties of Samples A-F are shown in Table 2.

Table 1

| Sample | Polymerization time (hour) | Conversion of polymerization (% by weight) | Styrene content in polymer (% by weight) |
|---|---|---|---|
| 1 | 1 | 25.3 | 19.2 |
| 2 | 2 | 48.0 | 14.5 |
| 3 | 3 | 68.1 | 10.1 |
| 4 | 4 | 88.0 | 8.8 |
| 5 | 5 | 100.0 | 8.0 |

Table 2

| Sample | Type | Styrene content (%) | Styrene content in a half of polymer chain (%) | Styrene content in another half of polymer chain (%) | Block-styrene content (%) | Content of 1,2-vinyl linkage in butadiene portion (%) | Mooney viscosity |
|---|---|---|---|---|---|---|---|
| Example A | Gradually-reduced-random-copolymer type-SBR | 8.0 | 14.1 | 1.9 | 0.3 | 13.0 | 45 |
| Comparative Example B | Complete-block-copolymer type-SBR | 8.2 | 0 | 16.4 | 8.1 | 12.5 | 46 |
| Comparative | Gradually-reduced-block- | 8.1 | 0.4 | 15.8 | 5.5 | 12.5 | 45 |

Table 2-continued

| Sample | Type | Styrene content (%) | Styrene content in a half of polymer chain (%) | Styrene content in another half of polymer chain (%) | Block-styrene content (%) | Content of 1,2-vinyl linkage in butadiene portion (%) | Mooney viscosity |
|---|---|---|---|---|---|---|---|
| Example C | copolymer type-SBR | | | | | | |
| Comparative Example D | Random-copolymerization-type-SBR | 8.0 | 8.1 | 8.0 | 0.0 | 12.3 | 47 |
| Comparative Example E | Emulsion-polymerization-SBR (Nipol 1006) | 23.5 | — | — | 0.0 | — | 44 |
| Comparative Example F | Solution-polymerization-polybutadiene | — | — | — | — | 13.0 | 45 |

Employing these rubbers as toughening agents, high-impact polystyrene compositions were obtained according to bulk polymerization as described hereinafter.

Six parts by weight of the above-mentioned toughening agents, 94 parts by weight of styrene, 8 parts by weight of toluene, 1.5 parts by weight of white mineral oil and 0.5 part by weight of 2,6-di-tert-butyl-4-methylphenol were stirred at room temperature for 12 hours or longer to form a solution, which was introduced into a reaction vessel. The temperature of the solution was elevated from 100°C up to 130°C over 5 hours with stirring, then elevated from 130°C up to 150°C over 7 hours with stirring, and finally polymerization was carried out at temperatures from 150°C up to 180°C for 3 hours. Thereafter, the temperature was elevated to 230°C to remove unreacted materials in vacuum. The resulting products were fed into an extruder to form pellets, which were then compression-molded and subjected to measurements of Izod impact strength, tensile strength and elongation at break according to JIS K6871 (JIS: Japanese Industrial Standards) and bending (or flexural) modulus according to ASTM 790.

On the other hand, the above-mentioned pellets were injection-molded into a sheet of 1 mm thick and that of 0.1 mm thick, the former being subjected to measurement of falling weight impact strength while the latter being subjected to evaluation of visible gel, in which the number per 500 cm² was observed by naked eyes.

As for the observation of the appearance of the shaped products, 0.3 part of micro carbon black was added to 100 parts of resin, and the resulting mixture was injection-molded using a mold of 150 mm × 150 mm and 2.5 mm thick, equipped with pin gates at both ends thereof. The appearance was judged by the conspicuousness of weld portion formed at the junction of resin flows from the gate parts. The results are shown in Table 3.

Table 3

| Physical properties | Example A Solution polymerization-SBR of gradually reduced random copolymer type used | Comparative Example B Solution polymerization-SBR of complete block-copolymer type used | Comparative Example C Solution polymerization-SBR of gradually reduced block-copolymer type used | Comparative Example D Solution polymerization-SBR of random copolymer type used | Comparative Example E Emulsion polymerization-SBR, Nipol-1006 used | Comparative Example F Solution polymerization-polybutadiene used |
|---|---|---|---|---|---|---|
| Solution viscosity (c.p.s.) (5% styrene solution, at 30°C) | 62 | 40 | 52 | 103 | 57 | 160 |
| Izod impact strength (Kg.cm/cm of notch) | 9.0 | 3.2 | 3.8 | 8.7 | 7.0 | 8.8 |
| Tensile strength (Kg/cm²) | 226 | 241 | 248 | 223 | 235 | 202 |
| Elongation at break (%) | 40 | 5 | 4 | 43 | 30 | 45 |
| Bending modulus (Kg/cm²) | 22,000 | 24,000 | 24,000 | 21,000 | 23,000 | 20,000 |
| Falling weight impact strength (Kg.cm) 23°C | 278 | 85 | 105 | 265 | 203 | 280 |
| Falling weight impact strength (Kg.cm) −40°C | 280 | 87 | 98 | 203 | 58 | 277 |
| Visible gel (number/500 cm²) | 2 | 1 | 2 | 4 | 22 | 12 |
| Appearance (conspicuousness of weld) | good | good | good | good | bad | bad |

As apparent from the results shown in Table 3, sample A (Example) was remarkably superior in high impact-resistance at room temperature to samples B and C (Comparative Examples) where block SBRs were used as a toughening agent, and also sample A (Example) was almost equal in tensile strength and elongation at break, superior in high impact-resistance particularly at lower temperatures, and slightly superior also in bending modulus, i.e. so-called stiffness, to sample D (Comparative Example) where a random SBR was used as a toughening agent. Further, sample A (Example) is superior in high impact-resistance at room temperature as well as at lower temperatures and much superior in the appearance of composition (conspicuousness of weld) and smaller in number of visible gel, to sample E (Comparative Example) where an emulsion-polymerization-SBR was used as a toughening agent. Furthermore, sample A (Example) was superior in tensile strength and stiffness and almost similar in high impact-resistance at room temperature and lower temperatures, to sample F (Comparative Example) where a solution-polymerization-polybutadiene was used as a toughening agent. Still further, sample A (Example) was better also in the appearance of composition and smaller in number of visible gel in the composition than sample F (Comparative Example). Further, the solution viscosity of copolymer dissolved in styrene monomer, in sample A (Example), was less than half of viscosity in sample F (Comparative Example). Thus, dissolution of rubber and transportation as well as stirring, of styrene solution of rubber were easy.

EXAMPLE 2

Using the toughening agent of the present invention and those of Comparative Examples described in Example 1, high impact polystyrene compositions were prepared in a manner of bulk polymerization followed by suspension polymerization as mentioned below.

Eight parts by weight of toughening agents A, B, C, D, E and F were added to 92 parts by weight of styrene, and each resulting mixture was stirred at 30°C for 12 hours to form a solution. After adding 0.06 part by weight of tert-dodecyl mercaptane, the solution was heated at 115°C for 6 hours with stirring in the absence of catalyst to form a solution whereby about 35% of styrene was polymerized. To the resulting solution were added 0.3 part by weight of trisnonylphenylphosphite and 0.1 part by weight of di-tert-butylperoxide, per 100 parts by weight of the solution. Using a solution obtained by dissolving 0.15 part by weight of polyvinyl alcohol as a stabilizer and 0.05 part by weight of sodium dodecylbenzenesulfonate as a surfactant, 100 parts by weight of the above-mentioned partially polymerized product was suspended. The resulting suspension was heated with stirring at 120°C for 5 hours, then at 130°C for 3 hours and finally at 150°C for 2 hours to substantially complete the polymerization of styrene. Mutual-polymerization product compositions of suspension particles thus obtained were separated from the reaction mixture by centrifuge, followed by washing with warm water and air-drying. The resulting compositions were molded into a required shape to give test samples, which were subjected to measurements of physical properties according to the methods described in Example 1. The results are shown in Table 4.

As seen from Table 4, even when a manner of bulk-polymerization followed by suspension-polymerization was employed, the product of sample A (Example) was a superior high impact-polystyrene composition which was extremely balanced in various properties of tensile strength, high impact-resistance (at room temperature and lower temperatures), bending modulus, appearance, member of visible gel, etc., as compared with samples B-F (Comparative Examples).

Table 4

| Composition / Physical properties | Example A Solution polymerization-SBR of gradually reduction random copolymer type used | Comparative Example B Solution polymerization-SBR of complete block-copolymer type used | Comparative Example C Solution polymerization-SBR of gradually reduced block-copolymer type used | Comparative Example D Solution polymerization-SBR of random copolymer type used | Comparative Example E Emulsion polymerization-SBR, 1006, used | Comparative Example F Solution polymerization polybutadiene used |
|---|---|---|---|---|---|---|
| Solution viscosity (c.p.s.) (5% styrene solution at 30°C) | 62 | 40 | 52 | 103 | 57 | 160 |
| Izod impact strength (Kg.cm/cm of notch) | 10.3 | 2.7 | 3.5 | 9.8 | 8.1 | 10.0 |
| Tensile strength (Kg/cm²) | 245 | 276 | 268 | 241 | 250 | 220 |
| Elongation at break (%) | 43 | 6 | 5 | 41 | 35 | 40 |
| Bending modulus (Kg/cm²) | 21,000 | 23,000 | 22,000 | 20,000 | 22,000 | 20,000 |
| Falling weight impact strength (Kg.cm) 23°C | 295 | 88 | 120 | 288 | 230 | 290 |
| Falling weight impact strength (Kg.cm) −40°C | 294 | 85 | 118 | 220 | 63 | 285 |
| Visible gel (number/500 cm²) | 4 | 3 | 4 | 3 | 28 | 13 |
| Appearance (conspicuousness of weld) | good | good | good | good | bad | bad |

EXAMPLE 3

Three kinds of solution-polymerization-SBR of gradually-reduced-random-copolymer type, i.e. sample H (Example) and samples G and I (Comparative Examples), were prepared in the same preparation manner as that of sample A in Example 1. The styrene content, styrene composition, block-styrene content, linkage in butadiene portion and Mooney viscosity are shown in Table 5. In addition, the values of sample A are also shown in Table 5 for reference.

Table 5

| Sample | Composition and viscosity | Styrene content (% by weight) | Styrene content at 50% conversion of polymerization (A) (% by weight) * | Styrene content in polymer obtained by polymerization after 50% conversion of polymerization (B) (% by weight) | Block-styrene content (% by weight) | 1,2-vinyl-linkage content (%) | Mooney viscosity |
|---|---|---|---|---|---|---|---|
| G | | 1.5 | 2.6 | 0.4 | 0.1 | 13.1 | 45 |
| H | | 5.0 | 8.5 | 1.5 | 0.2 | 13.2 | 43 |

Table 5-continued

| Sample | Composition and viscosity Styrene content (% by weight) * | Styrene content at 50% conversion of polymerization (A) (% by weight) | Styrene content in polymer obtained by polymerization after 50% conversion of polymerization (B) (% by weight) | Block-styrene content (% by weight) | 1,2-vinyl-linkage content (%) | Mooney viscosity |
|---|---|---|---|---|---|---|
| A | 8.0 | 14.1 | 1.9 | 0.3 | 13.0 | 45 |
| I | 15.2 | 25.0 | 5.4 | 1.5 | 13.1 | 44 |

*styrene content = $\frac{(A) + (B)}{2}$

Using samples G, H and I, polystyrene compositions were prepared in the same manner as that of bulk-polymerization in Example 1. Their physical properties are shown in Table 6, and those of the composition as example in Example 1 are also shown in Table 6 for reference.

Table 6

| Physical properties | Composition Comparative Example G | Example H | Example A | Comparative Example I |
|---|---|---|---|---|
| Solution viscosity c.p.s. (5% styrene, at 30°C) | 125 | 85 | 62 | 53 |
| Izod impact strength (Kg.cm/cm of notch) | 9.1 | 9.3 | 9.0 | 8.8 |
| Tensile strength (Kg/cm²) | 207 | 231 | 226 | 225 |
| Elongation at break (%) | 42 | 40 | 40 | 38 |
| Bending modulus (Kg/cm²) | 20,000 | 22,000 | 22,000 | 22,000 |
| Falling weight impact strength (Kg.cm) 23°C | 269 | 283 | 278 | 275 |
| Falling weight impact strength (Kg.cm) −40°C | 272 | 281 | 280 | 220 |
| Visible gel (number/500 cm²) | 8 | 3 | 2 | 3 |

As apparent from the results of the bulk-polymerization in Table 6, even in the case of a polystyrene composition wherein a solution-polymerization-SBR of gradually-reduced-random-copolymer type was used as a toughening agent, sample G (Comparative Example), having a styrene content in said SBR, less than those in the range defined in the present invention, was lower in tensile strength and bending modulus and larger in number of visible gel than samples H and A (Examples), each having a styrene content defined in the composition of the present invention, and was not much different in the above-mentioned properties, from the product wherein polybutadiene was used as a toughening agent. On the other hand, sample I (Comparative Example), having a styrene content outside the range defined in the present invention, was almost equal in tensile strength and bending modulus to samples H and A (Examples), but had a drawback of inferior high impact-resistance particularly at lower temperatures.

Next, a solution-polymerization-SBR of gradually-reduced-random-copolymer type having increased particularly 1,2-linkage in butadiene portion was prepared according to the following method:

Into 1,000 parts by weight of cyclohexane solution containing 0.075 part by weight of n-butyllithium catalyst and 0.2 part by weight of tetrahydrofurane, was fed a monomer mixture of 1,3-butadiene and styrene, continuously over 4–5 hours to carry out polymerization at 80°C. As for 1,3-butadiene, 115 parts by weight thereof were fed continuously at a constant rate over 4–5 hours, while, as for styrene, amount of feed per unit time was continuously varied so that the resulting styrene composition might be almost same as that of the solution-polymerization-SBR of gradually-reduced-random-copolymer type of sample A (Example). One example of the feed rates of styrene employed was as follows:

| | |
|---|---|
| At the start of feed | : 7.5 parts by weight/Hr |
| After one hour | : 4.0 parts by weight/Hr |
| After 2 hours | : 1.7 parts by weight/Hr |
| After 3 hours | : 0.5 part by weight/Hr |
| At termination of feed | : 0.2 part by weight/Hr |

On the other hand, the feed rate of 1,3-butadiene fed at the same time was 23.3 parts by weight/Hr and maintained constant at this rate.

After completion of polymerization, the resulting copolymer was separated in the same manner as in sample A (Example). The copolymer had a Mooney viscosity of 43; a 1,2-vinyl linkage in butadiene portion, of 30.0%; a styrene content of 8.1% by weight; and a block-styrene content of 0.0% by weight (Sample J).

During the polymerization, a part of active copolymer solution was sampled to determine the conversion of polymerization and the styrene content in active copolymer. As a result, the same composition as that of sample A (Example) was obtained as shown in the accompanying drawing. The physical properties are shown in Table 7. Those of sample A (Example) are also shown in Table 7 for reference.

Table 7

| Physical properties | Composition Example A | Comparative Example J |
|---|---|---|
| 1,2-vinyl linkage in toughening agent (%) | 13.0 | 30.0 |
| Izod impact strength (Kg.cm/cm of notch) | 9.0 | 7.5 |
| Tensile strength (Kg/cm²) | 226 | 203 |
| Elongation at break (%) | 40 | 35 |

Table 7-continued

| Physical properties | Composition | |
|---|---|---|
| | Example A | Comparative Example J |
| Bending modulus (Kg/cm$^2$) | 22,000 | 20,000 |
| Falling weight impact strength (Kg.cm) 23°C | 278 | 233 |
| Falling weight impact strength (Kg.cm) 23°C | 278 | 233 |
| Falling weight impact strength (Kg.cm) −40°C | 280 | 187 |

As apparent from the results of the bulk-polymerization in Table 7, even in the case of a polystyrene composition wherein a solution-polymerization-SBR of gradually-reduced-random-copolymer type was used as a toughening agent, sample J (Comparative Example) wherein a toughening agent which is outside the range of the percentage of the mode of butadiene linkage in said SBR was used, had a serious drawback that it was inferior in tensile strength and stiffness of sheet and inferior in high impact-resistance at room temperature and lower temperatures, as compared with sample A (Example) wherein a toughening agent having a percentage of 1,2-vinyl linkage defined in the composition of the present invention.

Next, in carrying out random copolymerization of 1,3-butadiene and styrene in a similar manner to that in the case of sample A, a given amount of styrene alone was first fed to the polymerization system, and polymerization was initiated. When a given amount of block-styrene was formed, feed of a monomer mixture of 1,3-butadiene and styrene was initiated to give solution-polymerization-SBRs, i.e. sample K (Example) and sample L (Comparative Example).

Further, a solution-polymerization-SBR of gradually-reduced-random-copolymer type having a styrene content of 8% (Sample M), which is included in the composition of the present invention, was obtained according to the following method:

Using a 10l-capacity, continuous polymerization vessel which is temperature-controllable separately at the lower part and the upper part thereof, respectively, and provided with a stirrer, a cyclohexane solution containing 20% by weight of a monomer mixture of 1,3-butadiene and styrene in a ratio by weight of 92:8, and a cyclohexane solution containing 15% by weight of n-butyllithium were at the same time and continuously fed at the lower part of the polymerization vessel, at a rate of 250 g/min and at a rate of 20g/min, respectively, and the resulting polymer after substantial completion of polymerization was continuously withdrawn at the top part of the vessel to give an aimed solution-polymerization-SBR of gradually-reduced-copolymer type. During the polymerization, the temperatures at the lower part of the polymerization vessel and at the upper part thereof were maintained almost constant at 100°C and at 120°C, respectively, to carry out polymerization. The analytical values of the resulting polymer are shown in Table 8. In addition, the polymer solution sampled at the lower part of the polymerization vessel was analyzed to give a conversion of polymerization of 52% and a styrene content of 2.2% by weight. Further, the polymer solution sampled at the middle part of the polymerization vessel was analyzed to give a conversion of polymerization of 87% and a styrene content of 5.6% by weight.

Using these three kinds of SBRs, polystyrene compositions were obtained in the same manner as in the bulk-polymerization of Example 1. The physical properties are shown in Table 8. The composition A (Example) is also shown in Table 8 for reference.

Table 8

| Physical properties | Composition | | | |
|---|---|---|---|---|
| | Example A | Example K | Comparative Example L | Example M |
| Block-styrene as toughening agent (% by weight) | 0.3 | 1.0 | 3.2 | 1.1 |
| Styrene content in copolymer at 50% conversion of polymerization (% by weight) | 14.1 | 14.9 | 15.0 | 2.2 |
| Styrene content in other copolymer portion than the above (% by weight) | 1.9 | 1.2 | 1.4 | 13.8 |
| Styrene content in the whole of copolymer (% by weight) | 8.0 | 8.1 | 8.2 | 8.1 |
| Mooney viscosity | 45 | 46 | 47 | 46 |
| Solution viscosity (c.p.s.) (5% styrene solution, at 30°C) | 62 | 59 | 55 | 65 |
| Izod impact strength (Kg.cm/cm of notch) | 9.0 | 8.5 | 6.8 | 8.7 |
| Tensile strength (Kg/cm$^2$) | 226 | 229 | 232 | 230 |
| Elongation at break (%) | 40 | 35 | 23 | 35 |

As apparent from the results of Table 8, even in the case of solution-polymerization-SBR of gradually-reduced-random-copolymer type, sample L (Comparative Example) wherein a toughening agent which is outside the block-styrene content in said SBR was used was inferior in high impact-resistance to samples A, K and M (Examples) wherein a toughening agent having a block-styrene content defined in the composition of the present invention was used.

What is claimed is:

1. A method for producing a high-impact polystyrene composition which comprises polymerizing a mixture consisting of
   1. 2–20% by weight of a solution-polymerization SBR of a random copolymer type obtained by solution-polymerization of butadiene and styrene in the presence of a lithium-based catalyst, and having a styrene content continuously and gradually reduced along the polymer chain, wherein the styrene content in said random copolymer is in the range of 3–10% by weight; the butadiene content therein is in the range of 90–97% by weight; among the modes of linkage in butadiene portion, 1,2-vinyl linkage is 20% or less; the block styrene content is 20% or less by weight of the total styrene content; and when the polymer chain (A-B) is divided into two equal molecular weight portions A and B, portion A has a styrene content of 1.5–2 times the average styrene content in the total copolymer and portion B has a styrene content of ½ or less of the average styrene content in the total copolymer, and
   2. 80–98% by weight of styrene,
   said polymerization being carried out in a manner of radical polymerization.

2. A method according to claim 1 wherein said radical polymerization is carried out in bulk polymerization manner.

3. A method according to claim 1 wherein said radical polymerization is carried out in bulk polymerization manner followed by suspension polymerization in series.

4. A method according to claim 1 wherein one part of the styrene which forms a high-impact polymer composition together with the solution-polymerization-SBR of gradually reduced-random-copolymer type is replaced by a monomer other than styrene which is copolymerizable with styrene, in the range of 50% by weight or less of the total monomer including styrene.

5. A method according to claim 1 wherein on part of the styrene which forms the solution-polymerization-SBR of gradually-reduced-random-copolymer type is replaced by a monovinyl aromatic hydrocarbon other than styrene which is copolymerizable with styrene, in the range of 50% by weight or less of the total monovinyl aromatic hydrocarbon of the SBR.

6. A method according to claim 1 wherein one part of 1,3-butadiene which forms the solution-polymerization-SBR of gradually-reduced-random-copolymer type is replaced by a conjugated diolefin other than 1,3-butadiene.

7. A method according to claim 1 wherein said lithium-based catalyst is selected from the group consisting of propyllithium, n-butyllithium, secondary-butyllithium, amyllithium, dilithiobutane, naphthyllithium and 1,4-dilithiobenzene.

8. A high-impact polystyrene composition obtained by polymerizing a mixture consisting of
   1. 2–20% by weight of a solution-polymerization SBR of a random copolymer type obtained by solution-polymerization of butadiene and styrene in the presence of a lithium-based catalyst, and having a styrene content continuously and gradually reduced along the polymer chain, wherein the styrene content in said random copolymer is in the range of 3–10% by weight; the butadiene content therein is in the range of 90–97% by weight; among the modes of linkage in butadiene portion, 1,2-vinyl linkage is 20% or less; the block styrene content is 20% or less by weight of the total styrene content; and when the polymer chain (A-B) is divided into two equal molecular weight portions A and B, portion A has a styrene content of 1.5–2 times the average styrene content in the total copolymer and portion B has a styrene content of ½ or less of the average styrene content in the total copolymer, and
   2. 80–98% by weight of styrene,
   said polymerization being carried out in a manner of radical polymerization.

9. A high-impact polystyrene composition according to claim 8, wherein said radical polymerization is carried out in bulk polymerization manner.

10. A high-impact polystyrene composition according to claim 8, wherein said radical polymerization is carried out in bulk polymerization manner followed by suspension polymerization in series.

11. A high-impact polystyrene composition according to claim 8, wherein one part of the styrene which forms a high-impact polymer composition together with the solution-polymerization-SBR of gradually reduced-random-copolymer type is replaced by a monomer other than styrene which is copolymerizable with styrene, in the range of 50% by weight or less of the total monomer including styrene.

12. A high-impact polystyrene composition according to claim 8, wherein one part of the styrene which forms the solution-polymerization-SBR of gradually-reduced-random-copolymer type is replaced by a monovinyl aromatic hydrocarbon other than styrene which is copolymerizable with styrene, in the range of 50% by weight or less of the total monovinyl aromatic hydrocarbon of the SBR.

13. A high-impact polystyrene composition according to claim 8, wherein one part of 1,3-butadiene which forms the solution-polymerization-SBR of gradually-reduced-random-copolymer type is replaced by a conjugated diolein other than 1,3-butadiene.

14. A high-impact polystyrene composition according to claim 8, wherein said lithium-based catalyst is selected from the group consisting of propyllithium, n-butyllithium, secondary-butyllithium, amyllithium, dilithiobutane, naphthyllithium and 1,4-dilithiobenzene.

* * * * *